United States Patent
Sheng (10) Patent No.: US 11,580,346 B2
(45) Date of Patent: Feb. 14, 2023

(54) MEMORY DEVICE WITH EMBEDDED SIM CARD

(71) Applicant: Intel Corporation, Santa Clara, CA (US)

(72) Inventor: Xiaofeng Sheng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 16/954,981

(22) PCT Filed: Mar. 6, 2018

(86) PCT No.: PCT/CN2018/078112
§ 371 (c)(1),
(2) Date: Jun. 17, 2020

(87) PCT Pub. No.: WO2019/169543
PCT Pub. Date: Sep. 12, 2019

(65) Prior Publication Data
US 2020/0380330 A1    Dec. 3, 2020

(51) Int. Cl.
*G06K 19/077* (2006.01)
*H01R 12/72* (2011.01)
(Continued)

(52) U.S. Cl.
CPC ..... *G06K 19/07739* (2013.01); *H01R 12/724* (2013.01); *H01R 13/6658* (2013.01); *H04B 1/3816* (2013.01)

(58) Field of Classification Search
CPC ............ G06K 19/07739; H01R 12/724; H01R 13/6658; H04B 1/3816
(Continued)

(56) References Cited

U.S. PATENT DOCUMENTS 6,375,482 B1 * 4/2002 Fan .................... H01R 13/7033
439/489
2007/0270040 A1 * 11/2007 Jang ...................... H05K 1/117
439/660
(Continued)

FOREIGN PATENT DOCUMENTS

| CA | 2629927 A1 * | 6/2007 | ............. G06K 19/07 |
| CN | 106688280 A * | 5/2017 | ............ H04W 16/18 |
| EP | 2790388 A1 * | 10/2014 | ........... H04M 1/0277 |

OTHER PUBLICATIONS

CN106688280A—Improved network searching, English machine translation, pp. 10. (Year: 2022).*
(Continued)

*Primary Examiner* — Tuyen K Vo
(74) *Attorney, Agent, or Firm* — Schwabe, Williamson & Wyatt, P.C.

(57) ABSTRACT

Embodiments of the present disclosure are directed towards a memory device removably couplable with a mobile device. In some embodiments, the memory device may include a PCB insertable in the mobile device. The PCB may include a first chip (a micro SD device); a second chip (a SIM card); a first contact electrically coupled with the first chip, to provide a first communication interface between the first chip and the mobile device; and a second contact electrically coupled with the second chip, to provide a second communication interface between the second chip and the mobile device. The first and second communication interfaces may provide for respective communications between the micro SD device and the mobile device, and between the SIM card and the mobile device, at the same time, when the PCB is removably coupled with the mobile device.

18 Claims, 7 Drawing Sheets

(51) Int. Cl.
*H01R 13/66* (2006.01)
*H04B 1/3816* (2015.01)

(58) Field of Classification Search
USPC .......................................... 235/451, 486, 492
See application file for complete search history.

(56) References Cited

U.S. PATENT DOCUMENTS

| | | | |
|---|---|---|---|
| 2011/0124229 A1 | 5/2011 | Li et al. | |
| 2014/0104767 A1* | 4/2014 | Sutherland | H04B 1/3816 |
| | | | 211/41.12 |
| 2015/0079847 A1* | 3/2015 | Liu | G06K 13/0831 |
| | | | 439/630 |
| 2016/0106006 A1* | 4/2016 | Hou | H05K 7/20509 |
| | | | 439/487 |
| 2016/0218467 A1 | 7/2016 | Peng et al. | |
| 2016/0359268 A1* | 12/2016 | Hu | G06K 13/0812 |
| 2017/0093057 A1 | 3/2017 | Wang et al. | |

OTHER PUBLICATIONS

International Patent Office—International Search Report and Written Opinion dated Nov. 28, 2018, from International Application No. PCT/CN2018/078112, 10 pages.

* cited by examiner

MEMORY DEVICE WITH EMBEDDED SIM CARD

CROSS REFERENCE TO RELATED APPLICATIONS

This application is a national phase entry under 35 U.S.C. § 371 of International Application No. PCT/CN2018/078112, filed Mar. 6, 2018, entitled "A MEMORY DEVICE WITH EMBEDDED SIM CARD," the entire disclosure of which is hereby incorporated by reference.

FIELD

Embodiments of the present disclosure generally relate to the field of computing devices, and more particularly, to memory devices removably couplable with mobile devices.

BACKGROUND

Current mobile devices may employ subscriber identification module (SIM) cards (sometimes two SIM cards for dual SIM card devices), along with micro secure digital (SD) devices. Some of the mobile devices may be configured as dual SIM card devices, A socket (card holder) insertable into such mobile device may typically include two slots, to receive either two SIM cards (one in each slot), or receive a SIM card in one slot and a micro SD device in another slot.

Typically, a first slot of the socket may have two communication interfaces: one for the micro SD device (micro SD card) and another for the SIM card. A second slot of the socket may have one communication interface for a SIM card. Accordingly, if two SIM cards are disposed in each slot of the socket inserted in a mobile device, only the SIM cards may be active at the same time, and a micro SD card may not be active because it is not included in the socket. If a SIM card is inserted in one slot of the socket, and a micro SD card is inserted in another slot of the socket, only one SIM card and the micro SD card may be active at the same time, but another SIM card may not be because it is not included in the socket. In other words, only two devices out of three (two SIM cards or a SIM card and a micro SD card) may be active at the same time when the socket is inserted in the mobile device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe techniques and configurations for a memory device (e.g., memory card) removably couplable with a mobile device. In some embodiments, the memory device may include a printed circuit board (PCB) insertable in the mobile device. The PCB may include a first chip (e.g., a micro SD device); a second chip (e.g., a SIM card); a first contact electrically coupled with the first chip, to provide a first communication interface between the first chip and the mobile device; and a second contact electrically coupled with the second chip, to provide a second communication interface between the second chip and the mobile device. The first and second communication interfaces may provide for respective communications between the micro SD device and the mobile device, and between the SIM card and the mobile device, at the same time, when the PCB is removably coupled with the mobile device, e.g., through a socket as described below.

The PCB may be insertable in the first slot of the socket couplable with the mobile device, and another device (e.g., another SIM card) may be insertable in the second slot of the socket couplable with the mobile device. Accordingly, all three devices (two SIM cards and the micro SD device) may be active (e.g., communicate with the mobile device components) when the socket is inserted in the mobile device.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

Figure 1:
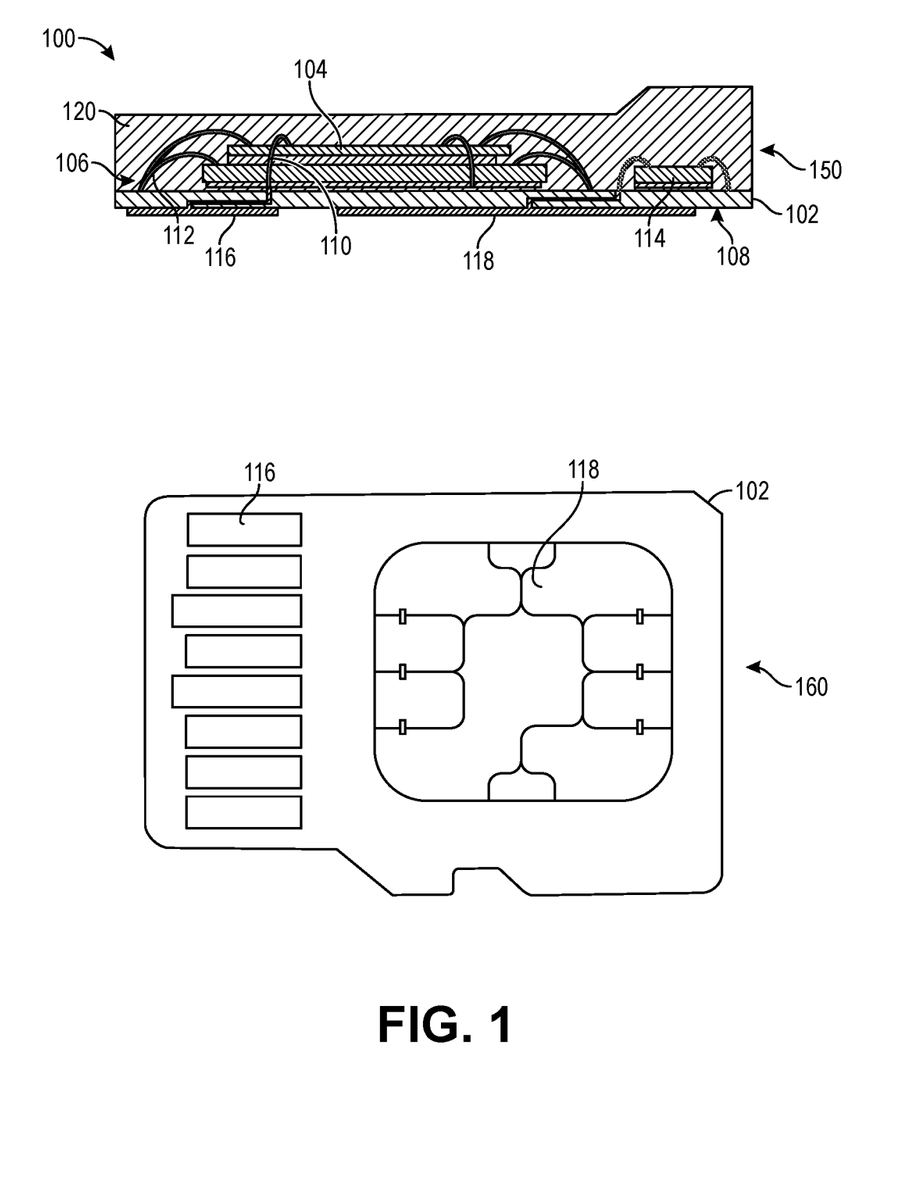
FIG. 1 provides side cross-sectional and bottom views of an example memory device, in accordance with some embodiments.

FIG. 1 provides a side cross-sectional view 150 and a bottom view 160 of an example memory device, in accordance with some embodiments. In embodiments, the memory device 100 may comprise a memory card removably couplable with (e.g., insertable in) a mobile device (not shown). As shown, the memory device 100 may include a printed circuit board (PCB) 102, which may house one or more chips 104 (e.g., two chips stacked, one or another, as shown). In embodiments, one or more chips 104 may comprise memory chips. In embodiments, the memory chips 104 may be disposed on one side 106 of the PCB 102 (as shown), or on both sides 106 and 108 of the PCB 102. In embodiments, the memory chips 104 may be coupled with the PCB 102 via wirebonds 110, 112. It will be understood that any types of electrical coupling between the chips 104 and the PCB 102 are possible, and wirebonding is shown for purposes of illustration. In embodiments, one or more of the memory chips 104 may comprise a micro SD device.

In embodiments, the memory device 100 may further include a chip 114. In embodiments, the chip 114 may be disposed on (e.g., embedded in) the same side 106 of the PCB 102, as the chip 104. For example, as shown in view 150, the chip 114 may be disposed at a distance, e.g., apart from the chip 104, on the PCB 102. In embodiments, the chip 114 may comprise a SIM card, which be used to store information related to the mobile device, with which the memory device 100 may be removably coupled. For example, the SIM card may store an identification number unique to the mobile device, some personal data associated with the owner of the mobile device (e.g., contact information), and the like. The SIM card may prevent operation of the mobile device if removed from the mobile device. The SIM card may also contain logic necessary for operating the mobile device.

The memory device 100 may further include a contact 116 electrically coupled with the memory chip 104 via interconnects inside the PCB 102 (not shown), to provide a communication interface between the memory chip 104 of the memory device 100 and the mobile device. The memory device 100 may also include a contact 118 electrically coupled with the chip 114 (SIM card) via interconnects inside the PCB 102 (not shown), to provide a communication interface between the chip 114 (SIM card) of the memory device 100 and the mobile device. In embodiments, at least some (or all) of the contacts 116 and 118 may comprise gold fingers, as shown in view 160.

In embodiments, the communication interfaces described above may provide for respective communications between the chip 104 and the mobile device, and between the chip 114 (SIM card) and the mobile device, at the same time, when the PCB 102 is removably coupled (inserted) in the mobile device. In other words, embedding the chip 114 (SIM card) into the memory device (memory card) 100, and providing; a corresponding communication interface (contact 118), may provide for a bi-functional memory card (including a SIM card and a micro SD device) with two communication interfaces. Such memory card may provide for simultaneous communications between the SIM card and corresponding components of the mobile device, and between the micro SD device and corresponding components of the mobile device.

In embodiments, the memory device 100 may further include a molding compound 120 disposed on the PCB 102 as shown, to encapsulate the memory chips 104 and 114 (e.g., the micro SD device and the SIM card, respectively).

Figure 2:
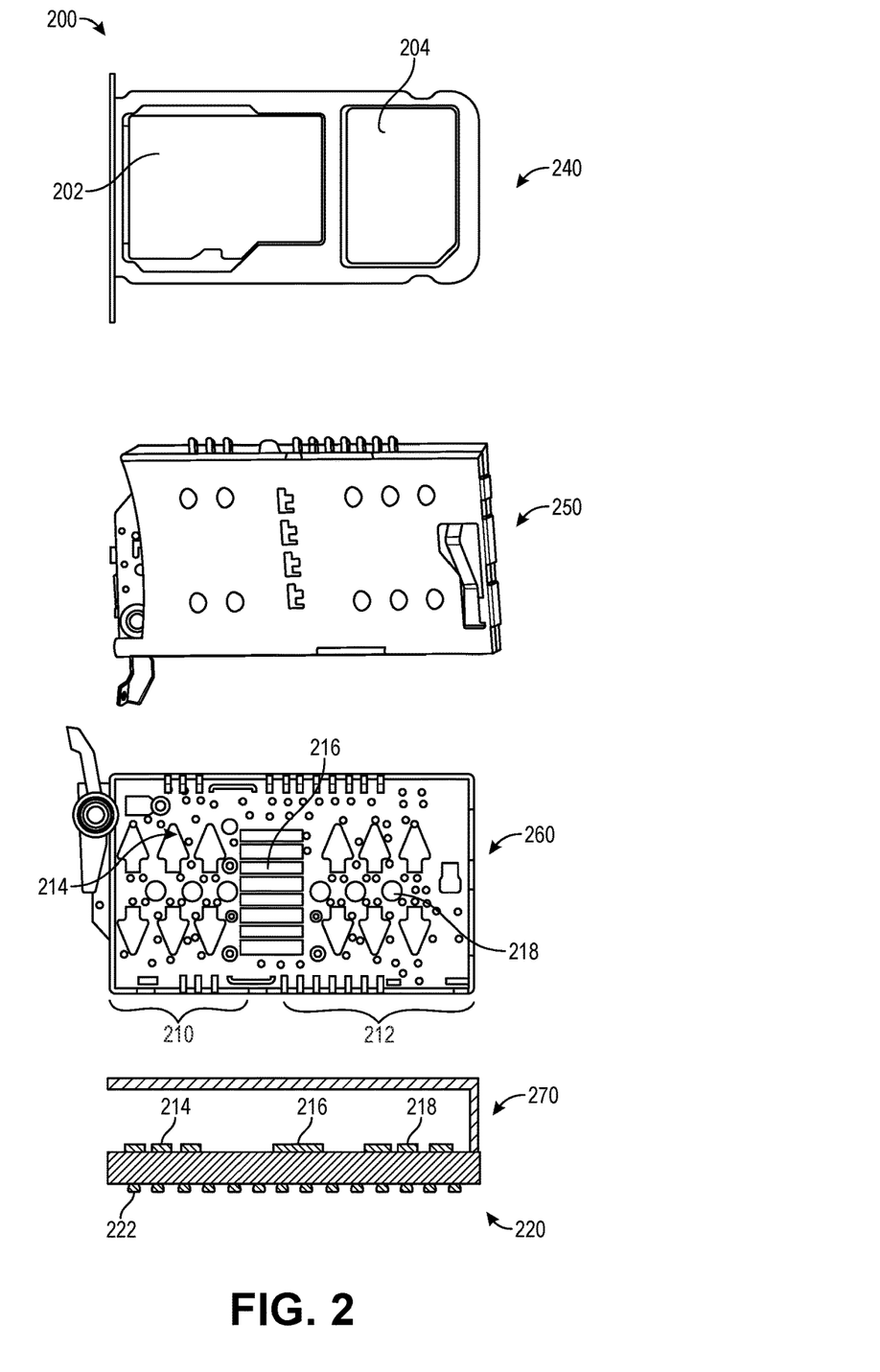
FIG. 2 illustrates different views of an example socket configured to receive the memory device of FIG. 1, in accordance with some embodiments.

FIG. 2 illustrates different views of an example socket (card holder) configured to receive the memory device of FIG. 1, in accordance with some embodiments. More specifically, view 240 of FIG. 2 illustrates the example socket 200 shown with slots 202 and 204, configured to receive memory devices, such as the memory device of FIG. 1. For example, PCB 102 may be insertable into at least one slot of the socket 200. For example, slot 202 may be configured to receive the memory device of FIG. 1 (a bi-functional memory card with the SIM card and micro SD device) and slot 204 may be configured to receive another device (e.g., another SIM card). The socket 200 may be insertable into a corresponding opening; of the mobile device, as will be described below. Views 250 and 260 illustrate respective top and bottom views of the socket 200 in an assembled state. As shown in view 260, portion 210 of the bottom view of the socket 200 may correspond to slot 202, and portion 212 may correspond to slot 204. Accordingly, interconnects 214 and 216 (shown in bottom view 260 and cross-sectional view 270 of the socket 200) may form communication interfaces for the memory device 100. For example, interconnects 216 may comprise an interface for the SIM card (chip 114 of FIG. 1), and interconnects 214 may comprise an interface for the micro SD device (chip 104 of FIG. 1).

The interconnects 218 may comprise an interface for another device (e.g., another SIM card) insertable into slot 204 of the socket 200. As shown, the outer side 220 of the back side of the socket 200 may include a number of interconnects 222 (e.g., balls, pads or other types of interconnects), to provide electric connectivity between the socket 200 and corresponding components of the mobile device, when the socket 200 is inserted in the mobile device (not shown).

In embodiments, the interconnects 214 and 216 may provide electric connectivity between the PCB 102 of FIG. 1 and a corresponding computing component (or components) of the mobile device. The interconnects 218 may provide electric connectivity between another SIM card insertable into slot 204 of the socket 200. Accordingly, if the memory device 100 is inserted into slot 202, and another device (SIM card) is inserted into slot 204 of the socket 200, and the socket 200 is coupled with (inserted into) a mobile device, the SIM card 114, micro SD device 104, and another SIM card may be able to communicate with corresponding components of the mobile device at the same time.

Figure 3:
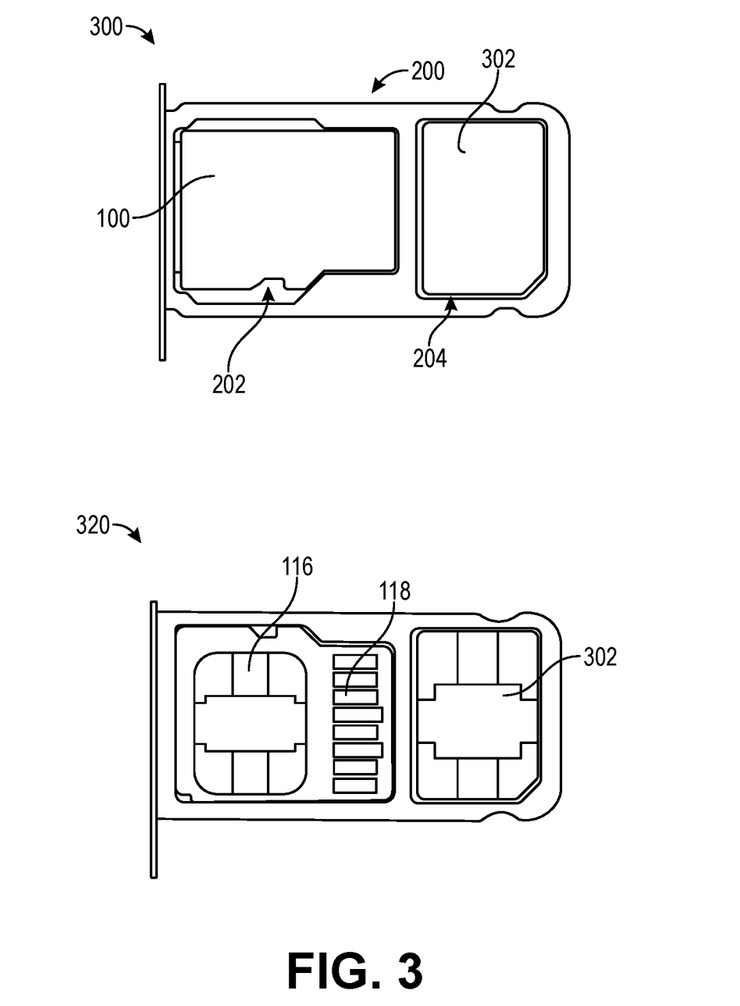
FIG. 3 illustrates top and bottom views of the socket of FIG. 2 in an assembled state, in accordance with some embodiments.

FIG. 3 illustrates top and bottom views of the socket of FIG. 2 in an assembled state, in accordance with some embodiments. For ease of explanation, like components of FIGS. 1, 2, and 3 are indicated with like numerals. More specifically, top and bottom views 300 and 320 show the socket 200 with the memory device 100 of FIG. 1 (e.g., SIM-embedded micro SD card) inserted in slot 202 of the socket 200. Another device 302 (e.g., a SIM card) may be inserted in slot 204 of the socket 200. Contacts 116 and 118 of the memory device 100 are shown in the bottom view 320 of FIG. 3. Accordingly, the socket 200 may function as a "three in one" socket, having a bi-functional memory device 100 in one slot, and another device 302 (e.g., a SIM card) in another slot. In other words, the embedded SIM card of the memory device 100, the micro SD card of the memory device 100, and the SIM card 302 may be simultaneously active (e.g., communicate at the same time) with corresponding components of the mobile device when the socket 200 is coupled with (inserted into) the mobile device.

Figure 4:
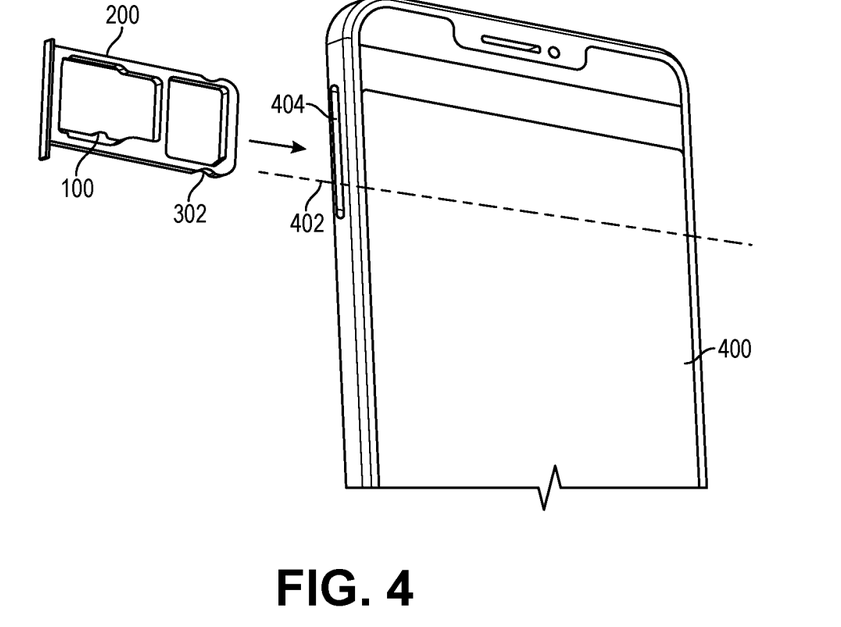
FIG. 4 is a perspective view of the memory device of FIG. 1 in the socket of FIG. 2, removably couplable with a mobile device, in accordance with some embodiments.

FIG. 4 is a perspective view of the memory device of FIG. 1 in the socket of FIG. 2, removably couplable with a mobile device, in accordance with some embodiments. More specifically, FIG. 4 illustrates the socket 200, assembled with the memory device 100 and an additional device 302. As shown, the socket 200 may be insertable into a corresponding opening 402 disposed on a side of the mobile device 400, as indicated by an arrow 404. As described above, the memory device 100 may include a SIM card and a micro SD device, and the device 302 may also include a SIM card. The mobile device 400 may be a dual SIM card device.

Figure 5:
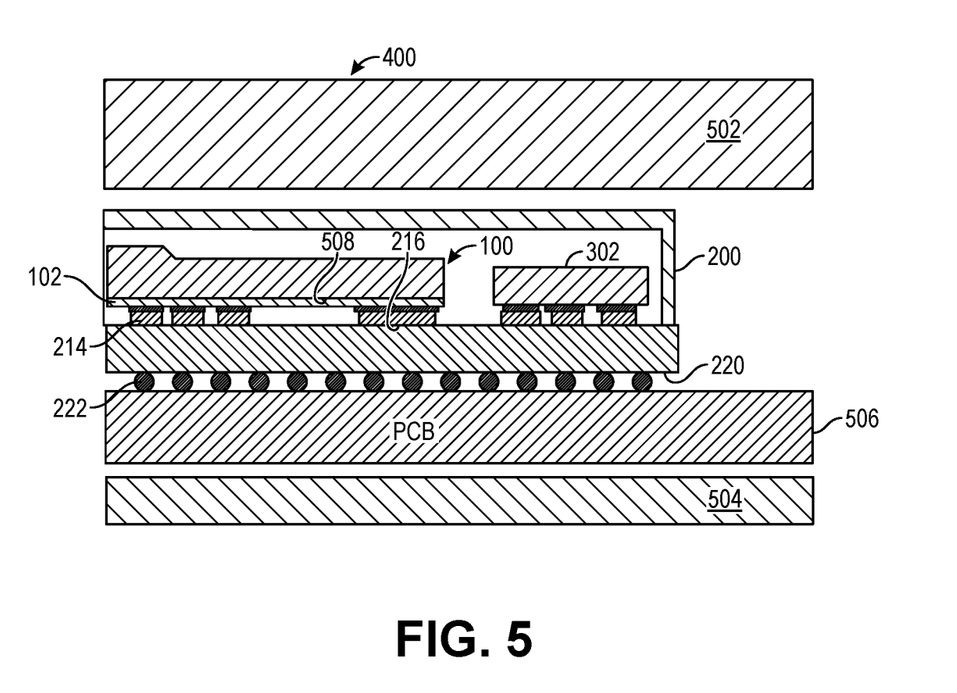
FIG. 5 is a cross-sectional side view of a portion of a mobile device with the memory device of FIG. 1 removably coupled with the mobile device, in accordance with some embodiments.

FIG. 5 is a cross-sectional side view of a portion of a mobile device with the memory device of FIG. 1 removably coupled with the mobile device, in accordance with some embodiments. The cross-section is provided along the dotted line A-A shown in FIG. 4.

The mobile device may be any mobile device that includes an opening for insertion of the card holder (e.g., socket 200 of FIG. 2) that may be configured to receive the memory device of FIG. 1. For example, the mobile device may be the mobile device 400 of FIG. 4. As noted above, the mobile device may be a dual SIM card mobile device.

As shown, the mobile device 400 may include a screen 502 on a first side, and a back cover 504 on a second side, opposite the first side. The mobile device 400 may further include a PCB 506 disposed between the back cover 504 and the screen 502. The PCB 506 may include various components necessary for functioning of the mobile device 400 (e.g., processor, memory, communication interfaces, and the like).

A memory card holder (socket 200) may be inserted in the mobile device 400. A portion of the socket 200 inserted in the mobile device 400 is shown in FIG. 5. A memory device 100 (e.g., memory card) may be inserted in one of the slots of the socket 200, as described in reference to FIG. 3. A portion 508 of the memory device 100 inserted in the socket 200 is shown in FIG. 5. Another device 302 (e.g., a PCB comprising a SIM card) may be inserted in another slot of the socket 200, as described in reference to FIG. 3. The portion 508 of the memory device 100 may include memory chips 104 and 114 of FIG. 1 (e.g., a micro SD device and a SIM card, not shown in FIG. 5). As described in reference to FIG. 1, the PCB 102 of the memory device 100 may Include contacts 116 and 118 (not shown in FIG. 5), to electrically connect with respective interconnects 214 and 216 (shown in FIG. 5). The socket 200 may further include interconnects 510 to provide communication capabilities between the SIM card 302 and the PCB 506 of the mobile device 400. The outer side 220 of the back side of the socket 200 may include a number of interconnects 222 (e.g., balls, pads or other types of interconnects), to provide electric connectivity between the memory device 100 (e.g., PCB 102) and the PCB 506 of the mobile device 400. As shown, the interconnects 222 may also provide electric connectivity between the SIM card 302 and the PCB 506 of the mobile device 400.

Figure 6:
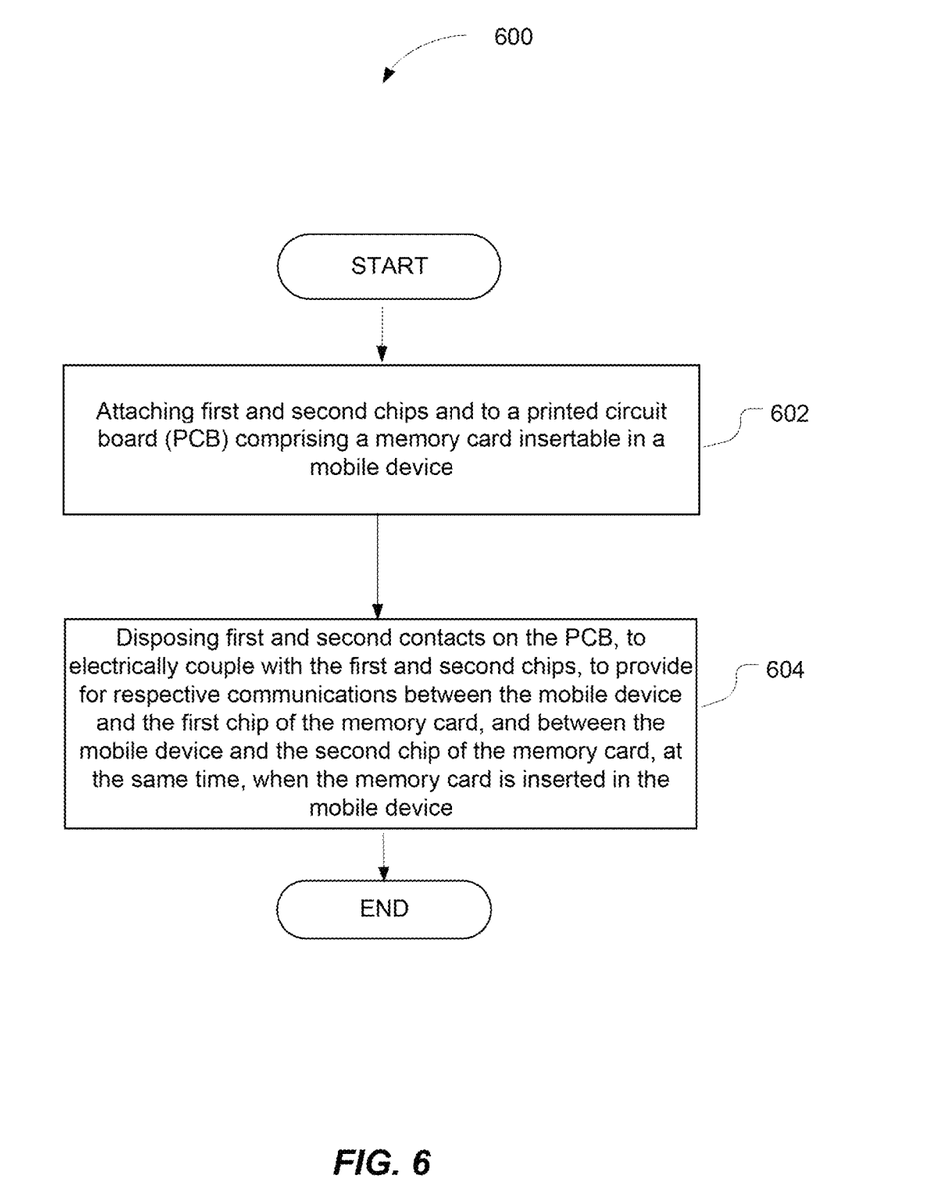
FIG. 6 is a process flow diagram for providing a memory device removably couplable with a mobile device, in accordance with some embodiments.

FIG. 6 is a process flow diagram for providing a memory device removably couplable with a mobile device, in accordance with some embodiments. The process 600 may comport with actions described in connection with FIGS. 1-5 in some embodiments. The application of the process 600 to formation of a memory device is provided for purposes of illustration and for ease of understanding.

At block 602, the process 600 may include attaching first and second chips to a printed circuit board (PCB) comprising a memory card that may be removably couplable with a mobile device. As described above, the first chip may comprise a micro SD device, and the second chip may comprise a SIM card for the mobile device. The mobile device may be a dual SIM card device.

In embodiments, attaching the first and second chips may include disposing the micro SD device and the SIM card on a first side of the PCB, and disposing the first and second contacts may include placing the first and second contacts on a second side of the PCB that is opposite the first side.

In embodiments, the process 600 may further include molding the PCB, to encapsulate the micro SD device and the SIM card on the PCB.

At block 604, the process 600 may include disposing first and second contacts on the PCB, to electrically couple with the first and second chips, respectively. The first and second contacts may form communication interfaces, to provide for respective communications between the mobile device and the first chip of the memory card, and between the mobile device and the second chip of the memory card, at the same time, when the memory card is removably coupled with (e.g., inserted in) the mobile device.

Figure 7:
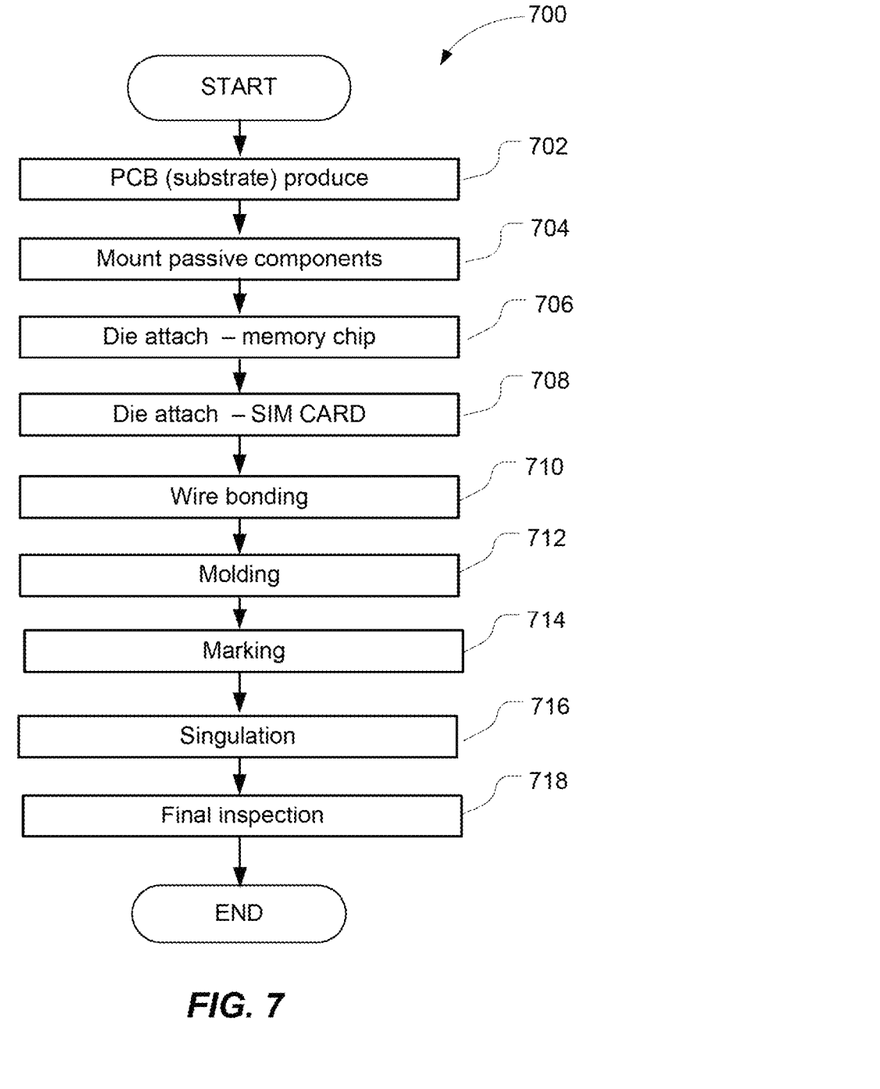
FIG. 7 is a process flow diagram for assembling a bi-functional memory card removably couplable with a mobile device, in accordance with some embodiments.

FIG. 7 is a process flow diagram for assembling a bi-functional memory card removably couplable with a mobile device, in accordance with some embodiments. More specifically, the process 700 describes the process of FIG. 6 in greater detail.

At block 702, the process 700 may include producing a PCB (e.g., a PCB substrate) for the memory card.

At block 704, the process 700 may include mounting (e.g., surface-mounting) passive components on the PCB.

At block 706, the process 700 may include attaching the die with a chip to the PCB. As described above, the chip may comprise a memory chip, such as a micro SD card.

At block 708, the process 700 may include attaching the die with another chip to the PCB. As described above, the other chip may be a SIM card.

At block 710, the process 700 may include wirebonding of the chips to the substrate.

At block 712, the process 700 may include molding the PCB, to encapsulate the attached chips.

At block 714, the process 700 may include marking of the card, such as providing a date code, lot code, and other device related information.

At block 716, the process 700 may include singulating the memory card, e.g., cutting a panel including multiple cards into pieces, to separate the produced memory card.

At block 718, the process 700 may include inspecting the memory card (including visual inspection).

Various operations of the processes 600 and 700 are described as multiple discrete operations, in a manner that is most helpful in understanding the claimed subject matter. However, the order of description should not be construed as to imply that these operations are necessarily order dependent. It will be appreciated that the sequence of operations associated with the processes 600 and 700 may vary and/or include other actions in accordance with the present disclosure.

The memory device and methods described herein may be implemented into a system using any suitable hardware and/or software to configure as desired.

Figure 8:
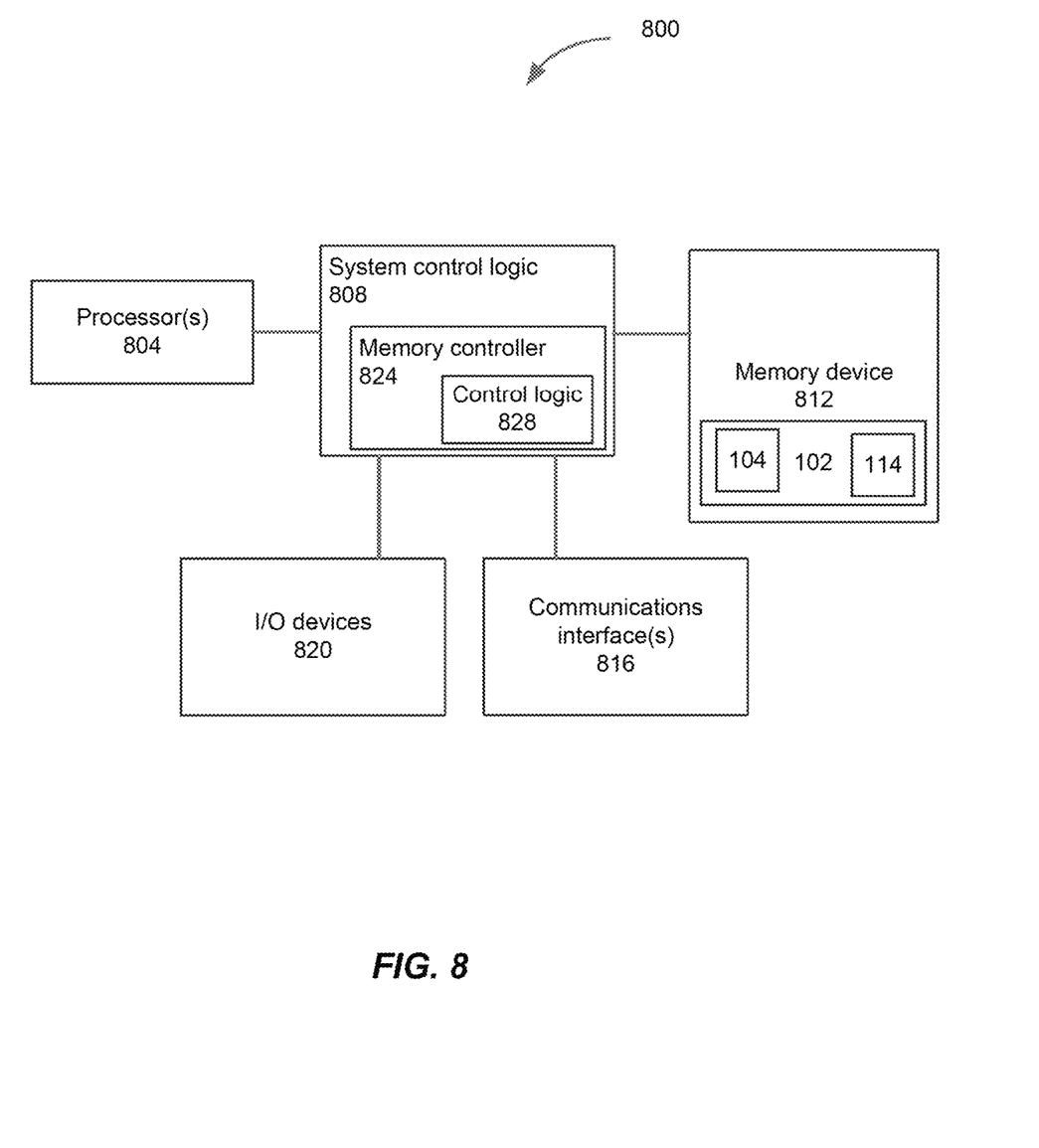
FIG. 8 schematically illustrates an example computing (mobile) device that may include a memory device as described in FIGS. 1-7, in accordance with some embodiments.

FIG. 8 schematically illustrates an example computing device (e.g., mobile device) that may include a memory device as described in FIGS. 1-7, in accordance with some embodiments. The computing device 800 may include system control logic 808 coupled to one or more processor(s) 804, a memory device 812, one or more communications interface(s) 816, and input/output (I/O) devices 820.

In some embodiments, the memory device 812 may be a non-volatile computer storage chip. In some embodiments, the memory device 812 may comprise a memory device 100 of FIG. 1 (e.g., memory card), having the PCB 102 with chips 104 and 114 (e.g., a micro SD card and a SIM card) as described in reference to FIGS. 1-5, The memory device may further include driver circuitry (e.g., drivers), input/output connections to electrically couple the memory device 812 with other components of the computing (mobile) device 800, etc. As described above, the memory device 812 may be configured to be removably coupled with the computing (mobile) device 800.

Communications interface(s) 816 may provide an interface for computing device 800 to communicate over one or more network(s) and/or with any other suitable device. Communications interface(s) 816 may include any suitable hardware and/or firmware. Communications interface(s) 816 for one embodiment may include, for example, a network adapter, a wireless network adapter, a telephone modem, and/or a wireless modem. For wireless communications, communications interface(s) 816 for one embodiment may use one or more antennas to communicatively couple the computing (mobile) device 800 with a wireless network.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

System control logic 808 for one embodiment may include any suitable interface controllers to provide for any suitable interface to at least one of the processor(s) 804 and/or to any suitable device or component in communication with system control logic 808. The system control logic 808 may move data into and/or out of the various components of the computing device 800.

System control logic 808 for one embodiment may include a memory controller 824 to provide an interface to the memory device 812 to control various memory access operations. The memory controller 824 may include control logic 828 that may be specifically configured to control access of the memory device 812.

In various embodiments, the I/O devices 820 may include user interfaces designed to enable user interaction with the computing device 800, peripheral component interfaces designed to enable peripheral component interaction with the computing device 800, and/or sensors designed to determine environmental conditions and/or location information related to the computing device 800. In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard. In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 816 to communicate with components of a positioning network, e.g., a global positioning system (GPS) satellite.

In embodiments, the computing device 800 may comprise a mobile device. The computing device 800 may have more or fewer components, and/or different architectures.

According to various embodiments, the present disclosure describes a number of examples.

Example 1 may be a memory device, comprising: a printed circuit board (PCB) removably couplable with a mobile device, wherein the PCB includes: a first chip disposed on the PCB, a second chip disposed on the PCB apart from the first chip; a first contact electrically coupled with the first chip, to provide a first communication interface between the first chip and the mobile device; and a second contact electrically coupled with the second chip, to provide a second communication interface between the second chip and the mobile device, wherein the first and second communication interfaces are to provide for respective communications between the first chip of the memory device and the mobile device, and between the second chip of the memory device and the mobile device, at a same time, when the PCB is removably coupled with the mobile device.

Example 2 may include the memory device of Example 1, wherein the first chip comprises a micro secure digital (SD) device, and wherein the second chip comprises a subscriber identification module (SIM) card.

Example 3 may include the memory device of Example 2, further comprising a molding compound disposed on the PCB, to encapsulate the micro SD device and the SIM card.

Example 4 may include the memory device of any Examples 1 to 3, wherein the first and second chips are disposed on a first side of the PCB, wherein the first and second contacts are disposed on a second side of the PCB that is opposite the first side.

Example 5 may include the memory device of Example 4, wherein the first and second contacts comprise gold fingers.

Example 6 may include the memory device of Example 2, further comprising a socket with at least one slot, wherein the socket is insertable into a corresponding opening of the mobile device, wherein the PCB is insertable into the at least one slot of the socket.

Example 7 may include the memory device of Example 6, wherein the at least one slot of the socket includes one or more interconnects to for the first and second communication interfaces, wherein the one or more interconnects are to provide electric connectivity between the PCB and a corresponding computing component of the mobile device.

Example 8 may include the memory device of Example 6, wherein the at least one slot is a first slot, wherein the SIM card is a first SIM card, wherein the socket includes a second slot, to receive a second SIM card.

Example 9 may include the memory device of Example 7, wherein the mobile device is a dual SIM card device.

Example 10 may be a mobile device, comprising: a first printed circuit board (PCB) disposed inside the mobile device; a second PCB removably couplable with the mobile device, wherein the second PCB includes: at least one memory chip; a subscriber identification module (SIM) card; a first contact electrically coupled with the memory chip, to provide a first communication interface between the memory chip and the first PCB; and a second contact electrically coupled with the SIM card, to provide a second communication interface between the SIM card and the second PCB, wherein the first and second communication interfaces are to provide for respective communications between the memory chip and the first PCB, and between the SIM card and the first PCB, at a same time, when the second PCB is removably coupled with the first PCB.

Example 11 may include the mobile device of Example 10, wherein the memory chip and the SIM card are disposed on a first side of the second PCB, wherein the first and second contacts are disposed on a second side of the second PCB that is opposite the first side.

Example 12 may include the mobile device of Example 10, further comprising a socket with at least one slot, wherein the second PCB is insertable into the at least one slot of the socket, wherein the socket is insertable into a corresponding, opening of the mobile device, to provide a communicative contact between the first and second PCB via at least the first and second communication interfaces.

Example 13 may include the mobile device of Example 12, wherein the at least one slot of the socket includes one or more interconnects to form the first and second communication interfaces, wherein the one or more interconnects are to provide electric connectivity between the first and second PCB.

Example 14 may include the mobile device of Example 12, wherein the at least one slot is a first slot, wherein the SIM card is a first SIM card, wherein the socket includes a second slot, to receive a second SIM card, wherein the mobile device is a dual SIM card device.

Example 15 may include the mobile device of any Examples 10 to 14, wherein the memory chip comprises a micro secure digital (SD) device, wherein the second PCB comprises a memory card.

Example 16 may be a method for providing a memory card for a mobile device, comprising: attaching; first and second chips to a printed circuit board (PCB) comprising the memory card removably couplable with the mobile device; and disposing first and second contacts on the PCB, to electrically couple with the first and second chips, respectively, wherein the first and second contacts form first and second communication interfaces, to provide for respective communications between the mobile device and the first chip of the memory card, and between the mobile device and the second chip of the memory card, at a same time, when the memory card is removably coupled with the mobile device.

Example 17 may include the method of Example 16, wherein the first chip comprises a micro secure digital (SD) device, and wherein the second chip comprises a subscriber identification module (SIM) card, wherein attaching the first and second chips includes disposing the micro SD device and the SIM card on a first side of the PCB, wherein disposing the first and second contacts includes placing the first and second contacts on a second side of the PCB that is opposite the first side.

Example 18 may include the method of Example 17, wherein attaching the first and second chips further includes wirebonding the micro SD device and the SIM card to the first side of the PCB.

Example 19 may include the method of Example 17, further comprising: molding the PCB, to encapsulate the micro SD device and the SIM card.

Example 20 may include the method of any Examples 16 to 19, wherein the mobile device is a dual SIM card device.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:

1. A memory card that comprises:
    a micro secure digital (SD) device disposed on a printed circuit board (PCB) of the memory card;
    a subscriber identification module (SIM) card disposed on the PCB apart from the micro SD device;
    a first contact electrically coupled with the micro SD device, the first contact to provide a first communication interface for first communication between the micro SD device and a mobile device when the memory card is removably coupled with the mobile device;
    a second contact electrically coupled with the SIM card, the second contact to provide a second communication interface for second communication between the SIM card and the mobile device when the memory card is removably coupled with the mobile device; and
    a molding compound to at least partially encapsulate the micro SD device and the SIM card;
    wherein the first and second communication are to at least partially overlap in time.

2. The memory card of claim 1, wherein the micro SD device and the SIM card are disposed on a first side of the PCB, wherein the first and second contacts are disposed on a second side of the PCB that is opposite the first side.

3. The memory card of claim 2, wherein the first and second contacts comprise gold fingers.

4. The memory card of claim 1, further comprising a socket with at least one slot, wherein the socket is insertable into a corresponding opening of the mobile device, wherein the PCB is insertable into the at least one slot of the socket.

5. The memory card of claim 4, wherein the at least one slot of the socket includes one or more interconnects to form the first and second communication interfaces, wherein the one or more interconnects are to provide electric connectivity between the PCB and a corresponding computing component of the mobile device.

6. The memory card of claim 4, wherein the at least one slot is a first slot, wherein the SIM card is a first SIM card, wherein the socket includes a second slot, to receive a second SIM card.

7. The memory card of claim 5, wherein the mobile card is a dual SIM card device.

8. A mobile device, comprising:
a first printed circuit board (PCB) disposed inside the mobile device;
a memory card removably couplable with the mobile device, wherein the memory card includes:
at least one memory chip;
a subscriber identification module (SIM) card;
a second PCB;
a first contact electrically coupled with the memory chip, the first contact to provide a first communication interface for first communication between the memory chip and the first PCB when the memory card is removably coupled with the mobile device; and
a second contact electrically coupled with the SIM card, the second contact to provide a second communication interface for second communication between the SIM card and the first PCB when the memory card is removably coupled with the mobile device;
wherein the first and second communication are to occur at least partially overlapped in time.

9. The mobile device of claim 8, wherein the memory chip and the SIM card are disposed on a first side of the second PCB, wherein the first and second contacts are disposed on a second side of the second PCB that is opposite the first side.

10. The mobile device of claim 8, further comprising a socket with at least one slot, wherein the second PCB is insertable into the at least one slot of the socket, wherein the socket is insertable into a corresponding opening of the mobile device, to provide a communicative contact between the first and second PCB via at least the first and second communication interfaces.

11. The mobile device of claim 10, wherein the at least one slot of the socket includes one or more interconnects to form the first and second communication interfaces, wherein the one or more interconnects are to provide electric connectivity between the first and second PCB.

12. The mobile device of claim 10, wherein the at least one slot is a first slot, wherein the SIM card is a first SIM card, wherein the socket includes a second slot, to receive a second SIM card, wherein the mobile device is a dual SIM card device.

13. The mobile device of claim 8, wherein the memory chip comprises a micro secure digital (SD) device, wherein the second PCB comprises a memory card.

14. The mobile device of claim 8, wherein the memory chip and the SIM card are communicatively isolated from one another.

15. A method for providing a memory card for a mobile device, comprising:
attaching first and second chips to a printed circuit board (PCB) to form the memory card, wherein the memory card is removably couplable with the mobile device; and
disposing first and second contacts on the PCB, to first and second contacts to electrically couple with the first and second chips, respectively; and
molding the PCB to encapsulate the first chip and the second chip;
wherein the first contact provides a first communication interface for first communication between the first chip and the mobile device when the memory card is removably coupled with the mobile device;
the second contact provides a second communication interface for second communication between the second chip and the mobile device when the memory card is removably coupled with the mobile device; and
the first communication and the second communication at least partially overlap in time.

16. The method of claim 15, wherein the first chip comprises a micro secure digital (SD) device, and wherein the second chip comprises a subscriber identification module (SIM) card, wherein attaching the first and second chips includes disposing the micro SD device and the SIM card on a first side of the PCB, wherein disposing the first and second contacts includes placing the first and second contacts on a second side of the PCB that is opposite the first side.

17. The method of claim 16, wherein attaching the first and second chips further includes wirebonding the micro SD device and the SIM card to the first side of the PCB.

18. The method of claim 15, wherein the mobile device is a dual SIM card device.

* * * * *